United States Patent
Schmidt et al.

(10) Patent No.: US 8,406,117 B2
(45) Date of Patent: *Mar. 26, 2013

(54) TRANSMISSION CIRCUIT AND METHOD FOR TRANSMITTING A BIT SEQUENCE TO BE TRANSMITTED

(75) Inventors: Michael Schmidt, Dresden (DE); Frank Poegel, Dresden (DE); Tilo Ferchland, Dresden (DE)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/285,998

(22) Filed: Oct. 31, 2011

(65) Prior Publication Data

US 2012/0045016 A1 Feb. 23, 2012

Related U.S. Application Data

(63) Continuation of application No. 12/481,269, filed on Jun. 9, 2009, now Pat. No. 8,050,295.

(60) Provisional application No. 61/060,619, filed on Jun. 11, 2008.

(30) Foreign Application Priority Data

Jun. 9, 2008 (DE) .......................... 10 2008 027 389

(51) Int. Cl.
*H04J 11/00* (2006.01)
(52) U.S. Cl. ...................................................... 370/208
(58) Field of Classification Search .................. 370/241, 370/203, 204, 205, 206, 208, 209; 375/267, 375/130–153, 353–376; 340/172.5
See application file for complete search history.

(56) References Cited

U.S. PATENT DOCUMENTS

| | | | |
|---|---|---|---|
| 3,829,843 A * | 8/1974 | Cichetti et al. | 360/76 |
| 5,960,028 A | 9/1999 | Okamote et al. | |
| 5,970,052 A * | 10/1999 | Lo et al. | 370/241 |
| 7,397,862 B2 * | 7/2008 | Ouyang et al. | 375/267 |
| 2004/0258134 A1 * | 12/2004 | Cho et al. | 375/131 |
| 2007/0086538 A1 | 4/2007 | Ouyang et al. | 375/267 |
| 2009/0168939 A1 * | 7/2009 | Constantinidis et al. | 375/359 |

FOREIGN PATENT DOCUMENTS

EP 0 758 823 B1 2/1997

OTHER PUBLICATIONS

Chinese First Office Action and English Translation of Text of the First Office Action, Patent Appl. No. 200910142407.7, Ser. No. 2012/022700697280, Ref. USBBL67337-LBS, dated Mar. 1, 2012 and received May 4, 2012 (11 pgs).

(Continued)

*Primary Examiner* — Jeffrey M Rutkowski
*Assistant Examiner* — Syed M Bokhari
(74) *Attorney, Agent, or Firm* — Baker Botts LLP

(57) ABSTRACT

In certain embodiments, a circuit includes a dividing device configured to divide a transmission bit sequence into a first bit sequence and a second bit sequence, bits adjacent to each other in the transmission bit sequence being separated by a bit time. The circuit includes a first device configured to generate first sampled values by sampling at a sampling rate a first fundamental wave that is based on the first bit sequence, and includes a second device configured to generate second sampled values by sampling at the sampling rate a second fundamental wave that is based on the second bit sequence, the second fundamental wave being shifted relative to the first fundamental wave by a time period. The circuit includes a summator configured to sum the first sampled values of the first fundamental wave and the second sampled values of the second fundamental wave to form an output value sequence.

20 Claims, 2 Drawing Sheets

OTHER PUBLICATIONS

IEEE Computer Society, IEEE Standard for Information technology—Telecommunications and information exchange between systems—Local and metropolitan area networks—Specific requirements, "*Part 15.4: Wireless Medium Access Control (MAC) and Physical Layer (PHY) Specifications for Low-Rate Wireless Personal Area Networks (WPANs)*", (3 pgs), Sep. 8, 2006.

State Intellectual Property Office (SIPO) of the People's Republic of China, Chinese Second Office Action and English Translation of Text of the Second Office Action, Chinese Patent Appl. No. 200910142407.7, Ref. USBBL67337-LBS, file 080900.1014, dated Nov. 26, 2012 (15 pgs).

\* cited by examiner

TRANSMISSION CIRCUIT AND METHOD FOR TRANSMITTING A BIT SEQUENCE TO BE TRANSMITTED

RELATED APPLICATIONS

This application is a continuation under 35 U.S.C. §120 of U.S. patent application Ser. No. 12/481,269 filed Jun. 9, 2009, entitled "Transmission Circuit and Method for Transmitting a Bit Sequence to be Transmitted," which will issue as U.S. Pat. No. 8,050,295 on Nov. 1, 2011. U.S. application Ser. No. 12/481,269 claims priority to German Patent Application No. 10 2008 027 389.9, which was filed in Germany on Jun. 9, 2008, and to U.S. Provisional Application No. 61/060,619, which was filed on Jun. 11, 2008.

TECHNICAL FIELD

The present invention relates to a transmission circuit and a method for transmitting a bit sequence to be transmitted.

BACKGROUND

A binary phase transformation (BPSK: binary phase shift keying) for the 868/915 MHz band with a data rate of 20 kbls in the 868 MHz band and 40 kbls in the 915 MHz Band is known from the industry standard IEEE 802.15.4. Spreading using two spreading codes (binary) and pulse shaping occurs in a transmission method. Bits in a bit sequence here have precisely one position, so that several bits are not transmitted in parallel.

SUMMARY

It is therefore an object of the present invention to improve as much as possible a method for transmitting a bit sequence. Instead of explicit binary spreading with precisely two code words and pulse shaping, an alternative method for transmitting a bit sequence to be transmitted is provided.

The bit sequence can be divided into an even-numbered bit sequence and an odd-numbered bit sequence. For this purpose, an even-numbered bit and an odd-numbered bit are assigned alternately accordingly to the even-numbered bit sequence and the odd-numbered bit sequence.

Depending on the even-numbered bit sequence, first sampled values of a first fundamental wave are formed. Depending on the odd-numbered bit sequence, second sampled values of a second fundamental wave are formed. The first fundamental wave and the second fundamental wave are thereby defined by the totality of the respective sampled values in regard to the specific bit.

The second fundamental wave is shifted by a time period relative to the first fundamental wave. The time period of the shift can be equal to the bit time of a bit. The first sampled values and the second sampled values can be equal in each case for a value {−1 or 1} of the bits.

The first sampled values of the first fundamental wave and the second sampled values of the second fundamental wave can be added to form an output value sequence.

The output value sequence is then processed. Advantageously, the rate of sampling of the output value sequence is converted. Preferably, the digital values of the output value sequence are converted digital-to-analog and then filtered. Advantageously, a carrier signal modulation, dependent on the output value sequence, occurs for the transmission.

The invention has as its object, furthermore, to provide as improved a transmission circuit as possible. Accordingly, a transmission circuit for transmitting a bit sequence to be transmitted is provided.

The transmission circuit can have a dividing device for dividing the bit sequence into an even-numbered bit sequence and into an odd-numbered bit sequence.

The transmission circuit has a first device for forming first sampled values of a first fundamental wave depending on the even-numbered bit sequence.

The transmission circuit has a second device for forming second sampled values of a second fundamental wave depending on the odd-numbered bit sequence. The second fundamental wave is shifted by a time period relative to the first fundamental wave.

The transmission circuit can have a summator for summation of the first sampled values of the first fundamental wave and the second sampled values of the second fundamental wave, so that the output value sequence is formed as a sum.

The invention furthermore has as its object to provide a use. Accordingly, a use of sampled values readable from a memory are provided to form an output value sequence, which represents in approximation spreading and pulse shaping of a bit sequence. The output value sequence is converted digital-to-analog within the scope of a binary chip sequence for transmitting the bit sequence.

The refinements described hereinafter relate to the transmission circuit, as well as to the use and to the method for transmission.

According to an embodiment, to form the first sampled values, the first sampled values are read out depending on a bit value of the even-numbered bit sequence. Preferably, the first sampled values are read out of a memory. To form the second sampled values the second sampled values are read out depending on a bit value of the odd-numbered bit sequence. The second sampled values are read out of a memory. For reading-out, addresses, for example, can be output to a memory. Advantageously, sampled values can be output by multiplexers for reading-out. It is also possible to control or clock a state machine for reading out the sampled values.

It is provided in another embodiment that the first sampled values are read out via a control of a first multiplexer, said control being dependent on the bit value of the even-numbered bit sequence. Alternatively or in combination, the second sampled values are read out by means of a control of a second multiplexer, said control being dependent on the bit value of the odd-numbered bit sequence.

For shifting the second fundamental wave relative to the first fundamental wave by the time period, the second multiplexer can be controlled offset by a number of sampled values relative to the first multiplexer.

Alternatively, for shifting the second fundamental wave relative to the first fundamental wave by the time period, it is advantageous to delay the second sampled values by means of a delay element.

According to an embodiment, it is provided that the sampling rate can be increased after the summation of the first sampled values and the second sampled values by sample rate conversion.

According to an embodiment, the first device can have a first multiplexer. The first multiplexer can be connected to a memory for reading out the first sampled values. The second device can have a second multiplexer. The second multiplexer can be connected to the memory for reading out the second sampled values. The memory is, for example, a read-only memory, whose stored values are formed, for example, by hard wiring with logic zero or with logic one (ROM). Alternatively, the memory is programmable and has nonvolatile memory cells, for example, (EEPROM).

According to an embodiment, it is provided that the first multiplexer and/or the second multiplexer can be formed for shifting the second fundamental wave relative to the first fundamental wave. For example, the control of the multiplexer is offset by the number of samplings forming the shift.

In an alternative embodiment, a delay element can be connected downstream of the second device for shifting the second fundamental wave relative to the first fundamental wave.

The dividing device can be formed as a (for example, third) multiplexer. The dividing device is preferably formed to assign the bit values (−1, 1) of the bit sequence alternately to the even-numbered bit sequence and the odd-numbered bit sequence by multiplexing.

According to an embodiment, a sample rate converter can be connected downstream of the summator to increase the sampling rate.

In another embodiment, it is provided that the first sampled values and the second sampled values correspond to spreading and pulse shaping. The sampled values can be calculated according to the spreading and pulse shaping.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DESCRIPTION OF EXAMPLE EMBODIMENTS

Pulse amplitude modulation in conjunction with frequency spreading methods, such as DSSS (direct sequence spread spectrum), can be used in communication technology systems. The signal bandwidth is increased considerably with the aid of spreading codes compared with the information rate. Advantages of such spreading, inter alia, are increased robustness to narrow-band interference and multipath propagation.

Figure 1:
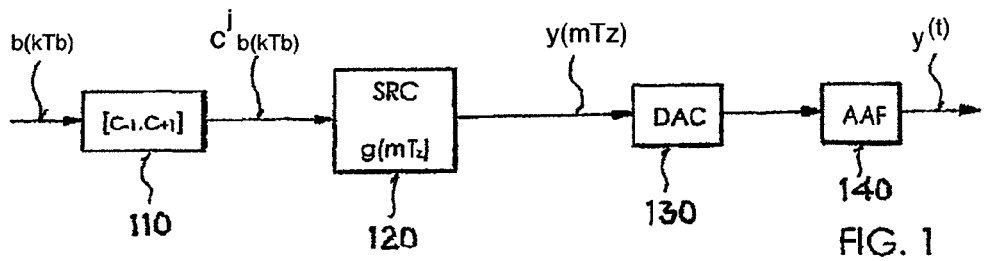
FIG. 1 is a first schematic block diagram.

In FIG. 1, the information-bearing bit sequence $b(kT_b)$ is limited to the alphabetic values of $\{-1, +1\}$ (binary) and therefore not multidigit. Here, $T_b$ is the bit time. Each bit is now assigned precisely one corresponding code word from the binary spreading code $\{c_{-1}, c_{+1}\}$, with $$C_{-1} = (c_{-1}^0, c_{-1}^1, \ldots, c_{-1}^{N-1}) \quad (1)$$

$$C_{+1} = (c_{+1}^0, c_{+1}^1, \ldots, c_{+1}^{N-1}) \quad (2)$$

The coefficients $c_{-/+1}$ of the code words (chips) in this case are any, also optionally complex-valued, signal constellations. The associated chip sequence $c^j b(kTb)$ is filtered at the output of encoder 110 with a pulse filter 120 with pulse response $g(t)$ relative to the chip time $T_c = T_b/N$. The baseband signal in the case of pulse-amplitude modulation (PAM) arises as:

$$y(t) = \sum_k \sum_{j=0}^{N-1} c_{b(kT_b)}^j g(t - jT_c - kT_b) \quad (3)$$

In FIG. 1, an implementation form of DSSS with time-discrete filtering is shown schematically as a block diagram. The chip sequence $c^j_{b(kTb)}$ is converted by sample rate conversion (SRC) to a higher rate $1/T_z$, whereby the pulse shaping may be part of the sample rate conversion. The sequence $y(mT_z)$ forms approximately the baseband signal $y(t)$ by means of digital-to-analog converter 130 (DAC) in conjunction with a continuous-time anti-aliasing filter 140 (AAF). With a sufficiently high rate $1/T_z$, the technical complexity of anti-aliasing filter 140 (AAF) declines.

Figure 2:
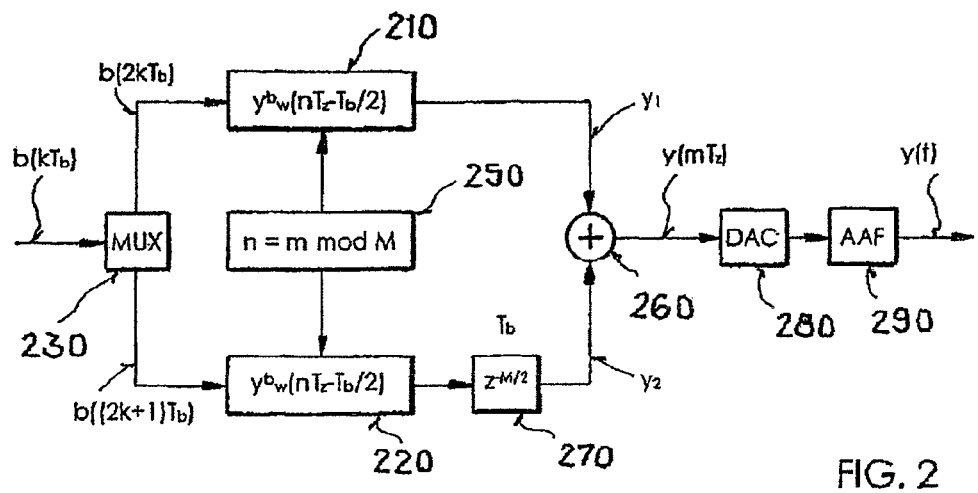
FIG. 2 is a second schematic block diagram according to an embodiment.
Figure 3:
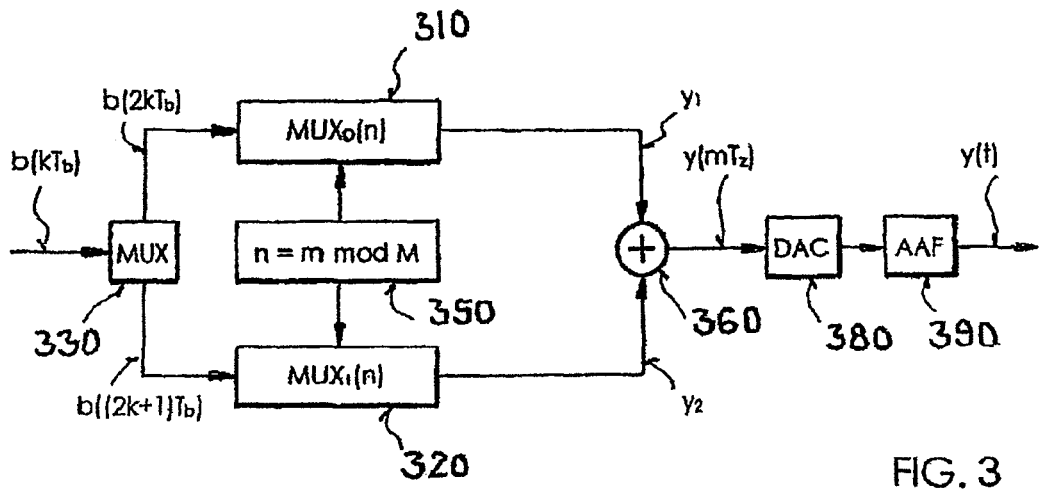
FIG. 3 is a third schematic block diagram according to an embodiment.
Figure 4:
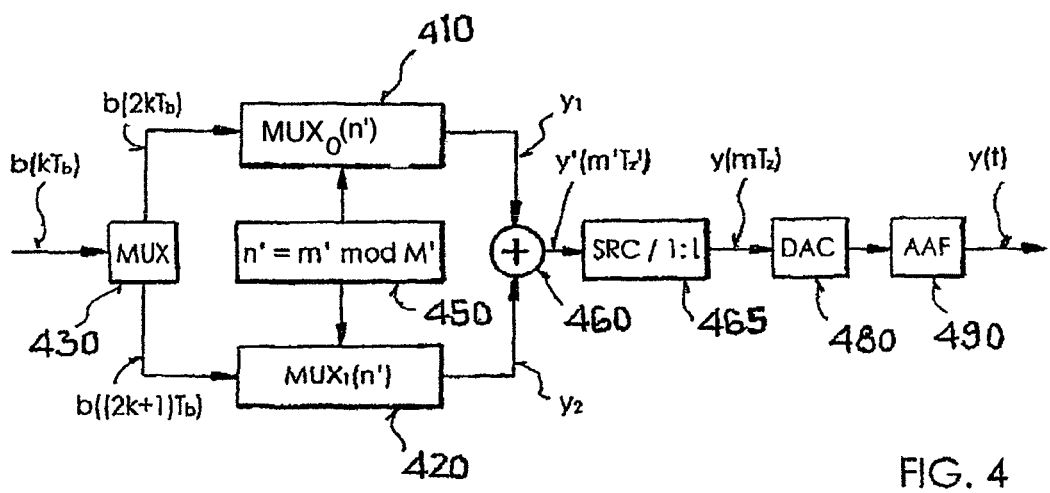
FIG. 4 is a fourth schematic block diagram according to an embodiment.

The following FIGS. 2 through 4 show simplified implementations of pulse amplitude modulation (PAM) in conjunction with binary spreading codes.

The simplified implementation is based on the basic idea that the baseband signal can be divided into components in regard to an even bit sequence and an odd bit sequence:

$$y(t) = \sum_k \sum_{j=0}^{N-1} c_{b(2kT_b)}^j g(t - jT_c - 2kT_b) + \quad (4)$$

$$\sum_k \sum_{j=0}^{N-1} c_{b((2k+1)T_b)}^j g(t - jT_c - (2k+1)T_b)$$

Because the fundamental frequency of the pulse shaping filter is specified in regard to $1/T_c$, the following applies in good approximation for code lengths that are not too small $N \gg 2$:

$$|g(t)| \approx 0_{for}^{|t| \geq \frac{T_b}{2} = \frac{N}{2} T_c} \quad (5)$$

Thus, the following applies:

$$y(t) \approx \sum_{j=0}^{N-1} c_{b(2kT_b)}^j g(t - jT_c) + \sum_{j=0}^{N-1} c_{b((2k+1)T_b)}^j g(t - jT_c - (2k+1)T_b) \quad (6)$$

The baseband signal at time t therefore forms approximately by a superimposition of two fundamental waves shifted in time by the bit time $T_b$ $$y_w^b(t) = \sum_{j=0}^{N-1} c_b^j g(t - jT_c) \quad (7)$$

where each fundamental wave can only assume the functions of $\{y_w^{-1}(t), y_w^{+1}(t)\}$. By elimination of the summation over k, the fundamental waves of the odd bit sequence and the even bit sequence are memoryless, so that no temporary storage of values is necessary. In this case, the fundamental waves are finite because of condition (5), i.e., limited to $2T_b$.

Instead of a device that provides for explicit spreading with subsequent sample rate conversion, a schematic block diagram of a transmission circuit with DSSS and pulse shaping by superimposition of fundamental waves offset in time is shown in FIG. 2.

The bit sequence $b(kT_b)$ is divided into an even-numbered bit sequence $b(2kT_b)$, therefore the bits with the index 0, 2, 4, 6, 8, etc., and into an odd-numbered bit sequence $b((2k+1)T_b)$, therefore the bits with the index 1, 3, 5, 7, etc. A multiplexer 230 is provided for this purpose, which assigns the bit values of the bit sequence $b(kT_b)$ alternately to the even-numbered bit sequence $b(2kT_b)$ and the odd-numbered bit sequence $b((2k+1)T_b)$ by switching.

Sampled values $y^b_w(nT_z-T_b/2)$ are output by a first device 210 and a second device 220. For the output, devices 210, 220 have, for example, a state machine or multiplexer for selecting, for example, hard-wired values. The first device 210 in this case is formed to output sampled values as a function of the even-numbered bit sequence $b(2kT_b)$ and as a function of a counter n. The second device 220 in this case is formed to output sampled values as a function of the odd-numbered bit sequence $b((2k+1)T_b)$ and as a function of a counter n. A control unit 250 is provided for this purpose.

The sampled values output by second device 220 are delayed by means of a delay element 270 with the function $z^{-M/2}$ by the time duration $T_b$, therefore the time duration of a bit. The output sampled values y1 of first device 210 and sampled values y2, output by second device 220 and delayed by delay element 270, are added by summator 260. The sum forms the output value sequence $y(mT_z)$. A digital-to-analog converter 280, which converts the output value sequence $y(mT_z)$ into analog values, is connected downstream of summator 260. The analog values are filtered by filter 290 (AAF: anti-aliasing filter), connected downstream of digital-to-analog converter 280, to obtain the baseband signal y(t).

Instead of a circuit that provides explicit spreading with subsequent sample rate conversion, in the exemplary embodiment of FIG. 2, the sampled values of the digital sampled values y1, y2, offset in time by $T_b$, of the fundamental values, offset in time, are output and then added to form the digital values $y(mT_z)$. The sampled values y1, y2 of the fundamental waves for $b=-1$ and $b=+1$ are stored in each case preferably in a table.

Because of condition (5), the length of the fundamental wave is limited approximately to $2T_b$. For a fixed b, the $$M=2T_b/T_z \quad (8)$$

values $y^b_w(nT_z-T_b/2)$ for $$n=(m \bmod M)=0, \ldots, M-1 \quad (9)$$

are needed. In this case, m goes from minus infinite to plus infinite. n determines the current sampled value of the fundamental wave.

The time shifting by $T_b$, therefore by M/2 sampled values, naturally need not be realized absolutely in the form of delay elements, such as 270 in FIG. 2. In the exemplary embodiment of FIG. 3, instead the relative delay of the fundamental waves is generated by the control of a first multiplexer 310 (MUX$_0$) and a second multiplexer 320 (MUX$_1$) by means of control device 350. First multiplexer 310 and second multiplexer 320 are connected to a memory unit, for example, a hard-wired value logic (ROM) or alternatively to a programmable memory unit (EEPROM) with the values $y^b_w(nT_z-T_b/2)$ stored, for example, in tables. The generation here occurs again as a function of an even-numbered bit sequence $b(2kT_b)$ and an odd-numbered bit sequence $b((2k+1)T_b)$ generated by a third multiplexer 330.

The two multiplexers 310 and 320 in this case are operated independently of one another. First multiplexer 310 forms the values $y^b_w(nT_z-T_b/2)$ as a function of n and $b=b(2kT_b)$. The values output by second multiplexer 320 are shifted cyclically by M/2 values relative to first multiplexer 310. The switching of second multiplexer 320 occurs relative to $b=b((2k+1)T_b)$. Again, the sampled values y1, y2 are obtained, which are added to the output sequence $y(mT_z)$ by summator 360. The output sequence $y(mT_z)$ is converted by digital-to-analog-converter 380 into an analog signal, which is filtered by means of filter 390 and output as baseband signal y(t).

FIG. 4 shows another exemplary embodiment. Multiplexers 410, 420, 430, a control circuit 450, a summator 460, a digital-to-analog-converter 480, and a filter 490 are again provided. In this exemplary embodiment, instead of the target rate $R_z$ first an intermediate rate $$R'_z = \frac{1}{l} R_z \quad (10)$$

with an integer $l>1$ is set to generate values $y'(m'T_z')$. The number of inputs into the multiplexers and number of table values are reduced as a result by the factor $l$. The remaining increase in rate to the required rate $R_z$ at the input of digital-to-analog converter 480 occurs by an additional sampled rate increase by means of a sample rate converter 465. Compared with the transmission circuit of FIG. 1, the total outlay (for a not too large f) is much lower, because the interpolation filter at the transition $R_z' \rightarrow R_z$ can be substantially more broadband compared with $R_c \rightarrow R_z$. In this regard, the effect occurs that recursive filter structures can be used for an efficient implementation. Another effect is that because of the integrity of $l$, it is to be assumed that clocking of the rate $R_z'$ can be derived in simple form from the rate $R_z$.

In fact, the previously described embodiment variants can be used in principle with any system with binary spreading. Preferably, the previously described embodiment variants, however, are used with a system according to the industry standard IEEE 802.15.4. In this case, binary phase shift keying is provided. The binary phase shift keying (BPSK) occurs in the 868/915 MHz bands. The data rate in the 868 MHz band is 20 kb/s and in the 915 MHz band 40 kb/s. In this case, a spreading procedure DSSS with BPSK for modulation of the chip is carried out. A differential coding is provided for the data symbol encoding. Each bit from the PPDU (physical layer protocol data unit) is processed by differential coding, bit-to-chip mapping, and modulation functions in an octet-like sequence, beginning with the preamble field and ending with the last octet of the PSDU (physical layer service data unit). For each octet, the bit with the lowest significance is processed first and the bit with the highest significance last.

The differential coding is connected upstream of multiplexers 230, 330, or 430 for use of the industry standard IEEE 802.15.4, but not shown in FIGS. 2 to 4. This is a modulo-2 addition, therefore an exclusive-or function of the current data bit and the previously differentially coded bit.

A 15-chip PN sequence is provided for the binary bit-to-chip mapping:

| Input bit | chip values$^{c0 \cdots c14}$ | | | | | | | | | | | | | | |
|---|---|---|---|---|---|---|---|---|---|---|---|---|---|---|---|
| −1 | 1 | 1 | 1 | 1 | −1 | 1 | −1 | 1 | 1 | −1 | −1 | 1 | −1 | −1 | −1 |
| 1 | −1 | −1 | −1 | −1 | 1 | −1 | 1 | −1 | −1 | 1 | 1 | −1 | 1 | 1 | 1 |

The chip sequences are modulated on a carrier signal by means of BPSK. In this case, raised cosine pulse shaping with the roll-off factor of 1 is used. In this case, a chip value of 1 is assigned to a positive pulse and a chip value of −1 to a negative pulse. The chip with the lowest value is transmitted first and the chip with the highest value last.

For the binary bit-to-chip mapping and BPSK modulation, the exemplary embodiments of FIGS. 2 to 4 enable significant simplification of the circuit without negatively affecting the functionality of the system defined by the industry standard IEEE 802.15.4.

The invention is not limited to the shown embodiment variants of FIGS. 2 through 4 and also not to the industry standard IEEE 802.15.4. For example, it is also possible to use the embodiment variants for a different transmission standard with binary spreading. It is also possible to divide the even-numbered bit sequence and/or the odd-numbered bit sequence into additional bit sequences, whereby accordingly additional fundamental waves shifted to one another are formed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method comprising:
    dividing a transmission bit sequence into a first bit sequence and a second bit sequence, bits adjacent to each other in the transmission bit sequence being separated from each other by a bit time;
    generating first sampled values by sampling at a sampling rate a first fundamental wave that is based on the first bit sequence;
    generating second sampled values by sampling at the sampling rate a second fundamental wave that is based on the second bit sequence, the second fundamental wave being shifted by a time period relative to the first fundamental wave; and
    summing the first sampled values and the second sampled values to form an output value sequence.

2. The method of claim 1, wherein:
    generating the first sampled values comprises reading out the first sampled values based on a bit value of the first bit sequence; and
    generating the second sampled values comprises reading out the second sampled values based on a bit value of the second bit sequence.

3. The method of claim 2, wherein one or more of the following is true:
    the first sampled values are read out via a control of a first multiplexer, the control being dependent on the bit value of the first bit sequence; and
    the second sampled values are read out via a control of a second multiplexer, the control being dependent on the bit value of the second bit sequence.

4. The method of claim 3, wherein, for shifting the second fundamental wave relative to the first fundamental wave by the time period, the second multiplexer is controlled offset by a number of sampled values relative to the first multiplexer.

5. The method of claim 1, wherein, for shifting the second fundamental wave relative to the first fundamental wave by the time period, the second sampled values are delayed by a delay element.

6. The method of claim 1, wherein the sampling rate is increased after the summation of the first sampled values and the second sampled values.

7. The method of claim 1, wherein:
    the sampling of the first fundamental wave is performed within a first sampling window having a time duration that is based on the bit time and the sampling rate; and
    the sampling of the second fundamental wave is performed within a second sampling window having the time duration of the first sampling window.

8. A circuit comprising:
    a first dividing device configured to divide a transmission bit sequence into a first bit sequence and a second bit sequence, bits adjacent to each other in the transmission bit sequence being separated from each other by a bit time;
    a first device configured to generate first sampled values by sampling at a sampling rate a first fundamental wave that is based on the first bit sequence;
    a second device configured to generate second sampled values by sampling at the sampling rate a second fundamental wave that is based on the second bit sequence, the second fundamental wave being shifted relative to the first fundamental wave by a time period; and
    a summator configured to sum the first sampled values of the first fundamental wave and the second sampled values of the second fundamental wave to form an output value sequence.

9. The circuit of claim 8, wherein one or more of the following is true:
    generating the first sampled values comprises reading out the first sampled values based on a bit value of the first bit sequence; and
    generating the second sampled values comprises reading out the second sampled values based on a bit value of the second bit sequence.

10. The circuit of claim 9, wherein:
    the first sampled values are read out via a control of a first multiplexer, the control being dependent on the bit value of the first bit sequence; and
    the second sampled values are read out via a control of a second multiplexer, the control being dependent on the bit value of the second bit sequence.

11. The circuit of claim 10, wherein, for shifting the second fundamental wave relative to the first fundamental wave, the second multiplexer is controlled offset by a number of sampled values relative to the first multiplexer.

12. The circuit of claim 8, wherein, for shifting the second fundamental wave relative to the first fundamental wave by the time period, the second sampled values are delayed by a delay element.

13. The circuit of claim 8, wherein the sample rate is increased after the adding of the summation of the first sampled values and the second sampled values.

14. The circuit of claim 8, wherein the first sampled values and the second sampled values correspond to spreading and pulse shaping.

15. The circuit of claim 8, comprising:
- a second dividing device configured to divide the first bit sequence into a third bit sequence; and
- a third device configured to third sampled values by sampling at the sampling rate a third fundamental wave that is based on the third bit sequence.

16. The circuit of claim 15, wherein the first dividing device and the second dividing device are distinct devices.

17. The circuit of claim 8, further comprising:
- a converter configured to convert the output value sequence into analog values; and
- a filter configured to filter the analog values to obtain a baseband signal.

18. The circuit of claim 8, wherein:
- the sampling of the first fundamental wave is performed within a first sampling window having a time duration that is based on the bit time and the sampling rate; and
- the sampling of the second fundamental wave is performed within a second sampling window having the time duration of the first sampling window.

19. The circuit of claim 8, wherein:
- the first bit sequence comprises an even-numbered bit sequence; and
- the second bit sequence comprises an odd-numbered bit sequence.

20. A system comprising:
- means for dividing a transmission bit sequence into a first bit sequence and a second bit sequence, bits adjacent to each other in the transmission bit sequence being separated from each other by a bit time;
- means for generating first sampled values by sampling at a sampling rate a first fundamental wave that is based on the first bit sequence;
- means for generating second sampled values by sampling at the sampling rate a second fundamental wave that is based on the second bit sequence, the second fundamental wave being shifted by a time period relative to the first fundamental wave; and
- means for summing the first sampled values and the second sampled values to each other to form an output value sequence.

* * * * *